United States Patent
Kumamoto et al.

(10) Patent No.: US 7,185,980 B2
(45) Date of Patent: Mar. 6, 2007

(54) INK JET RECORDING APPARATUS

(75) Inventors: Kouichi Kumamoto, Hachioji (JP);
Yoshihide Hoshino, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 303 days.

(21) Appl. No.: 10/838,810

(22) Filed: May 3, 2004

(65) Prior Publication Data

US 2004/0227783 A1 Nov. 18, 2004

(30) Foreign Application Priority Data

May 15, 2003 (JP) ............... 2003-137714
Mar. 26, 2004 (JP) ............... 2004-092499

(51) Int. Cl.
*B41J 2/01* (2006.01)
*B41J 2/165* (2006.01)

(52) U.S. Cl. .................. 347/102; 347/30; 347/33

(58) Field of Classification Search ............ 347/102, 347/30, 33, 29, 31, 32, 34, 35, 36, 5, 9, 16, 347/17, 19
See application file for complete search history.

(56) References Cited

U.S. PATENT DOCUMENTS 6,350,071 B1  2/2002  Conwell et al.
6,805,439 B2 * 10/2004 Maeda et al. ............. 347/96
6,951,376 B2 * 10/2005 Ishikawa ................... 347/11
2001/0052920 A1  12/2001  Matsumoto et al.
2003/0189609 A1 * 10/2003 Ishikawa ................... 347/11

FOREIGN PATENT DOCUMENTS

JP    2003127347 A  *  5/2003

* cited by examiner

*Primary Examiner*—Stephen Meier
*Assistant Examiner*—Leonard Liang
(74) *Attorney, Agent, or Firm*—Frishauf, Holtz, Goodman & Chick, P.C.

(57) ABSTRACT

An ink jet recording apparatus having: a recording head having a jet opening for jetting an ink which is cured by an irradiation with light, toward a recording medium; a light source for irradiating an ink jetted on the recording medium with light, a maintenance unit for performing a maintenance operation to the recording head; a suction cap member to suction an ink from the jet opening or near the jet opening; a wipe member to wipe an ink in the jet opening or near the jet opening; a control section for controlling the light source to turn on or off, wherein the control section controls the light source to have a light quantity of ½ or less of that at a time of an image recording, in a maintenance operation performed by at least one of the wipe member and the suction cap member.

16 Claims, 5 Drawing Sheets

FIG.2

INK JET RECORDING APPARATUS

BACKGROUND OF THE INVENTION

1. Field of the Invention

The present invention relates to an ink jet recording apparatus and, more particularly, to an ink jet recording apparatus capable of preventing light from a light source from entering into a recording head.

2. Description of the Related Art

Recently, for performing image recording on a packing material, there have been generally used a gravure printing method and a flexographic printing method. However, a plate making process is required for the gravure printing method and a flexographic printing method, so that they are disadvantageous in small-lot printing in view of the cost.

As an image recording method capable of easily recording images at low cost, there is known an image recording apparatus in which ink jet system is used (hereinafter, referred to as "ink jet recording apparatus"). The ink jet recording apparatus comprises a recording head for jetting ultraviolet curable ink onto a recording medium as droplets, and a light source for radiating light to cure the ink jetted onto the recording medium. A carriage on which the recording head and the light source are mounted is moved over the recording medium to perform image recording (for example, see JP-Tokukai-2001-310454A).

However, in such the ink jet recording apparatus, when continuously performing image recording, the ink which is jetted from jet openings of the recording head turn into spray would cause clogging, that is, the ink would adhere and deposit at a portion near the jet openings of the recording head, and clog in the jet openings. Continuing image recording in this condition would cause problems such as a failure of jetting ink.

Therefore, a recent ink jet recording apparatus is provided with a maintenance unit so that the recording head can be recovered from clogging to normally perform image recording by removing ink adhered to the jet openings of the recording head and a portion near the jet openings.

The above described ink removing operation is performed by moving a carriage on which the recording head is mounted to a maintenance region where the maintenance unit is arranged.

The maintenance unit comprises a suction cap member to suction and remove ink clogged in the jet openings of the recording head, and a wipe member to wipe ink adhered and deposited at the jet openings and a portion near the jet openings. The suction cap member covers a nozzle-plate of the recording head to suction the ink, and the wipe member wipes the nozzle-plate by a blade.

However, the above maintenance unit arranged in an exposed state would be directly irradiated with light radiated from a light source in a maintenance operation. Thus, the light radiated from the light source would be diffusely reflected from a surface of the maintenance unit on the recording head side, thereby entering into a portion near the jet openings of the recording head.

Therefore, since photo curable ink adhered to the jet openings and a portion near the jet openings is cured, problems arise, such as a failure to jet ink, that is clogging, or a failure to jet ink droplets in a correct direction, that is ink jet path bending.

Moreover, photo curable ink adhered to and cured on the suction cap of the maintenance unit or the wipe member would result in a failure to normally perform maintenance.

SUMMARY OF THE INVENTION

The present invention is developed in view of the above described problems, and an object of the present invention is to provide an ink jet recording apparatus with high reliability capable of preventing light from entering into a recording head or a maintenance unit to thereby avoid clogging of photo curable ink, ink jet path bending, improper maintenance or the like.

In accordance with a first aspect of the present invention, the ink jet recording apparatus comprises:

a recording head having a jet opening for jetting an ink which is cured by an irradiation with light, toward a recording medium;

a light source for irradiating an ink jetted on the recording medium with light;

a maintenance unit for performing a maintenance operation to the recording head;

a suction cap member to suction an ink from the jet opening or near the jet opening;

a wipe member to wipe an ink in the jet opening or near the jet opening;

a control section for controlling the light source to turn on or off, wherein the control section controls the light source to have a light quantity of ½ or less of that at a time of an image recording, in a maintenance operation performed by at least one of the wipe member and the suction cap member.

Accordingly, since the control section controls the light source to make a light quantity from the light source be ½ or less of that at a time of image recording in the maintenance operation performed by at least one of the wipe member and the suction cap member of the maintenance unit, an ink jet recording apparatus in which light diffusely reflected from the maintenance unit to enter into the recording head side is reduced can be obtained. Thereby, clogging caused by photo curable ink adhered to and cured on the jet opening or a portion near the jet opening, or ink jet path bending can be prevented.

When image recording is performed after the completion of maintenance, a light source needs to be turned on with a light quantity necessary for image recording, however, in a case that the light source is turned off while performing maintenance, it would take some time to obtain the light quantity needed. However, when the light source has a light quantity of ½ or less of that at a time of image recording in maintenance, the time needed to restart image recording can be shortened.

Preferably, in the apparatus of the first aspect of the present invention, the control section controls the light source to turn off at a time of a maintenance operation performed by at least one of the wipe member and the suction cap member.

Accordingly, since the control section controls the light source to turn off at a time of maintenance performed by at least one of the wipe member and the suction cap member, the ink jet recording apparatus capable of preventing light from the light source from being diffusely reflected from the maintenance unit to enter into the recording head side. Specially, in a case of using cationic curable ink as photo curable ink, it is cured even by a small amount of ultraviolet rays when irradiated for a long time. However, when the light source is turned off, cationic curable ink can be prevented from being cured over a long period of time.

Preferably, in the apparatus of the first aspect of the present invention, the wipe member is formed with an extra fine fiber having a fineness of 0.2 to 0.01 denier and is formed in a sheet shape wound around a first roll shaft and a second roll shaft, and an absorbing member fed from the first roll shaft is wound around the second roll shaft.

Accordingly, since the wipe member is formed with an extra fine fiber having a fineness of 0.2 to 0.01 denier, ink can be absorbed more effectively by capillary action or the like.

Further, since the wipe member is formed in a sheet shape wound around the first and second roll shafts, the wipe member fed from the first roll shaft can be wound around the second roll shaft from a portion in which ink is absorbed in order. Thus, the wipe member wound around the second roll shaft can be collected, enabling to prepare a new wipe member to arrange on the first roll shaft.

Preferably, in the apparatus of the first aspect of the present invention, the recording head is a serial type in which a recording is performed by reciprocating the recording head in a main scanning direction.

Accordingly, the ink jet recording apparatus of serial type in which the control section controls the light source to turn off at a time of the maintenance operation performed by the wipe member of the maintenance unit to prevent light from the light source from being reflected diffusely from the maintenance unit to enter into the recording heads side can be obtained.

Preferably, in the apparatus of the first aspect of the present invention, the recording head is a line head type in which the recording head is arranged to extend in a width direction of the recording medium to perform a recording while moving the recording medium.

Accordingly, the ink jet recording apparatus of line type in which the control section controls the light source to turn off at a time of the maintenance operation performed by the wipe member of the maintenance unit to prevent light from the light source from being reflected diffusely from the maintenance unit to enter into the recording heads side can be obtained.

Preferably in the apparatus of the first aspect of the present invention, the ink comprises an ultraviolet curable ink.

Accordingly, the ink jet recording apparatus in which ultraviolet curable ink is used can be obtained.

Preferably, in the apparatus of the first aspect of the present invention, the ultraviolet curable ink has a viscosity of 10 to 50 mPa·s at 25° C. and a surface tension of 20 to 40 mN/m.

Here, although the ultraviolet curable ink has viscosity of 10 to 50 mPa·s at 25° C. and surface tension of 20 to 40 mN/m, that is, having high viscosity and low wetting property, the ink can be prevented from adhering and fixing onto the suction cap member.

Preferably, in the apparatus of the first aspect of the present invention, the ink comprises a cationic polymerizable ink.

Accordingly, an ink jet recording apparatus in which cationic polymerizable ink is used can be obtained.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

DETAILED DESCRIPTION OF THE PREFERRED EMBODIMENTS

Hereinafter, the preferred embodiments of the present invention will be described in detail by reference to FIGS. 1 to 5. Incidentally, the description in this column does not limit the technical scope of claims and the meaning of terminologies. Moreover, the affirmative descriptions in the embodiments of the present invention indicate the best mode, and thus do not limit the meaning of terminologies and the technical scope of the present invention.

Figure 1:
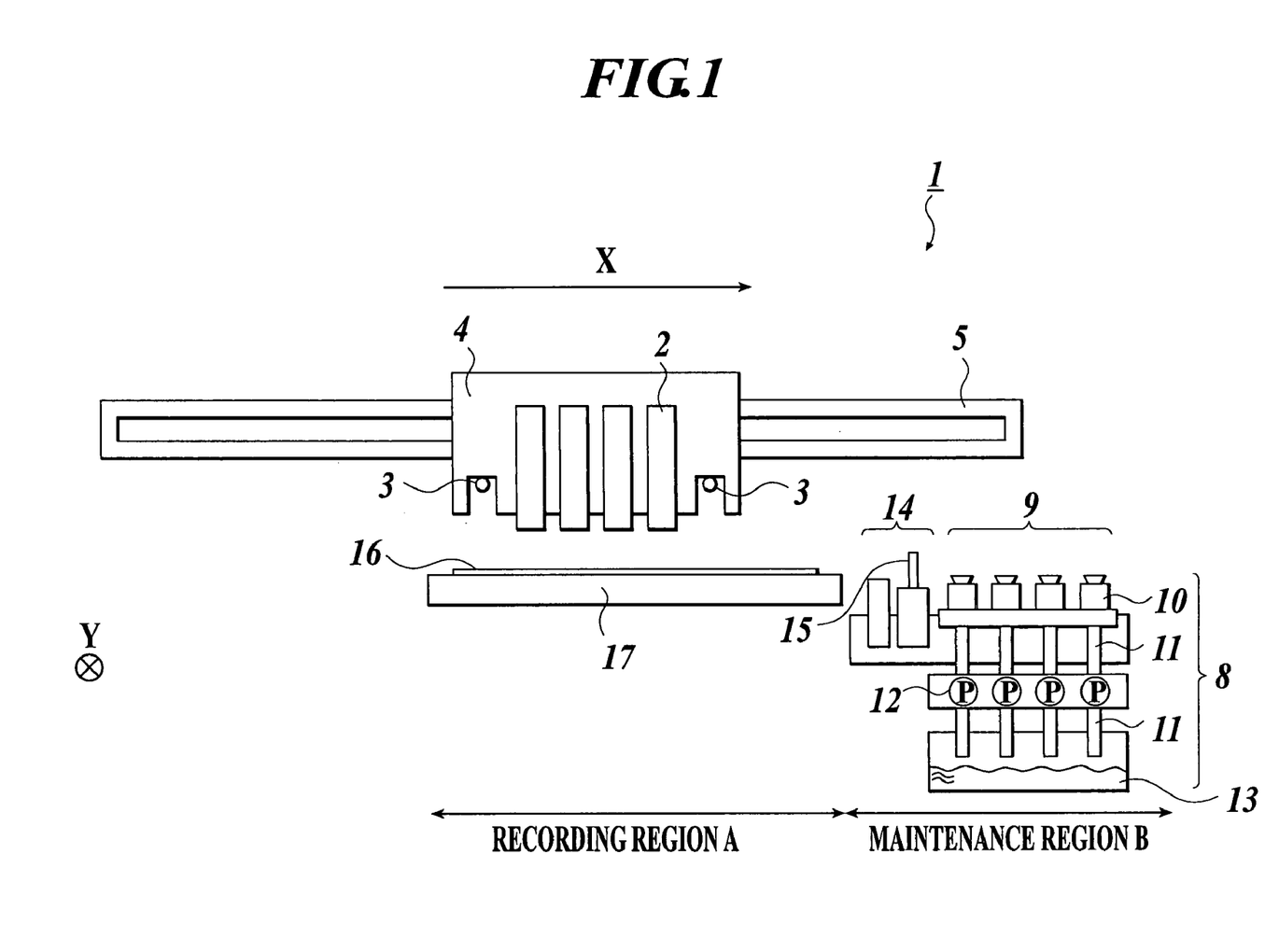
FIG. 1 is a schematic view showing a main portion of an ink jet recording apparatus of the first embodiment.

FIG. 1 is a schematic front view showing an ink jet recording apparatus of this embodiment. As shown in FIG. 1, an ink jet recording apparatus 1 of the first embodiment is a serial type in which photo curable ink is used.

The ink jet recording apparatus 1 comprises recording heads 2, 2 . . . , each of which has jet openings for jetting any one of the photo curable inks of yellow (Y), magenta (M), cyan (C) and black (Bk), and a carriage 4 which is provided with light sources 3, 3 . . . for irradiating the ink jetted onto a recording medium 16 with light to cure. The recording heads 2, 2 . . . are arranged in spaced, parallel relation to one another on the carriage 4. Each light source 3 is arranged on both sides of the recording heads 2 in a main scanning direction X. Examples of the light source 3 includes, for example, a high pressure mercury lamp, a low pressure mercury lamp, a metal halide lamp, a hot cathode fluorescent tube, a cooling pipe, an LED or the like.

The above carriage 4 is reciprocated by a carriage drive mechanism 6 over the recording medium 16 along a bar shaped guide rail 5 by which the carriage 4 is supported.

The reciprocating direction of the carriage 4 is referred to as the main scanning direction X, and a direction perpendicular to the main scanning direction X is referred to as a sub scanning direction Y. The ink jet recording apparatus 1 is provided with a recording medium carrying mechanism 7 for carrying the recording medium 16 in the sub scanning direction Y. The ink jet recording apparatus is provided with a recording medium carrying mechanism 7 for carrying the recording medium 16 in the sub scanning direction Y.

A center portion of a carriage movable region along the main scanning direction X is referred to as a recording region A in which image recording is performed on the recording medium 16, and a platen 17 for supporting the recording medium 16 from a non-recording surface is provided in the recording region A.

There is a maintenance region B for performing a maintenance operation of the jet openings of the recording heads 2, 2 . . . or the like on one side of the recording region A in the carriage movable region. In the maintenance region B, a maintenance unit 8 for performing the maintenance operation is provided.

The maintenance unit 8 comprises a suction cap member 9 for a suction maintenance to suction and remove bubbles generated in the jet openings together with the ink clogged in the jet openings. The suction cap member 9 comprises suction caps 10, 10 . . . as many as the recording heads 2, 2 . . . . When the carriage 4 moves to the maintenance region B, each suction cap 10 is adapted to correspond to one of the recording heads 2, 2 . . . to cover the jet openings of the recording heads 2, 2 . . . . There is provided a maintenance unit drive mechanism (not shown) in the maintenance region B, by which the maintenance unit 8 is moved to the recording heads 2, 2 . . . side to thereby make the recording heads 2, 2 . . . closely contact with the suction caps 10, 10 . . . .

There is provided an absorbing member (not shown) in each suction cap 10, which is made of porous resin with hydrophilic treatment such as Bell Eta (trademark from Kanebo) or the like.

An ink communicating tube 11 is provided at the bottom surface of each suction cap 10 to communicate with the inside thereof. Each ink communicating tube 11 is provided with a suction pump 12 in the middle thereof, and a waste ink tank 13 is arranged at the low ends of the ink communicating tubes 11, 11 . . . , for receiving the ink suctioned.

The maintenance unit 8 comprises a wipe member 14 to wipe the ink adhered to the jet openings and a portion near the jet openings on one side of the suction 10, 10 . . . in the main scanning direction X. Wiping maintenance is performed while pressing the wipe member 14 onto the jet openings of the recording heads 2, 2 . . . , so that the maintenance unit 8 is adapted to reciprocate in the sub scanning direction Y by the above described maintenance unit drive mechanism.

A control section 100 in this embodiment will be explained referring to FIG. 2.

Figure 2:
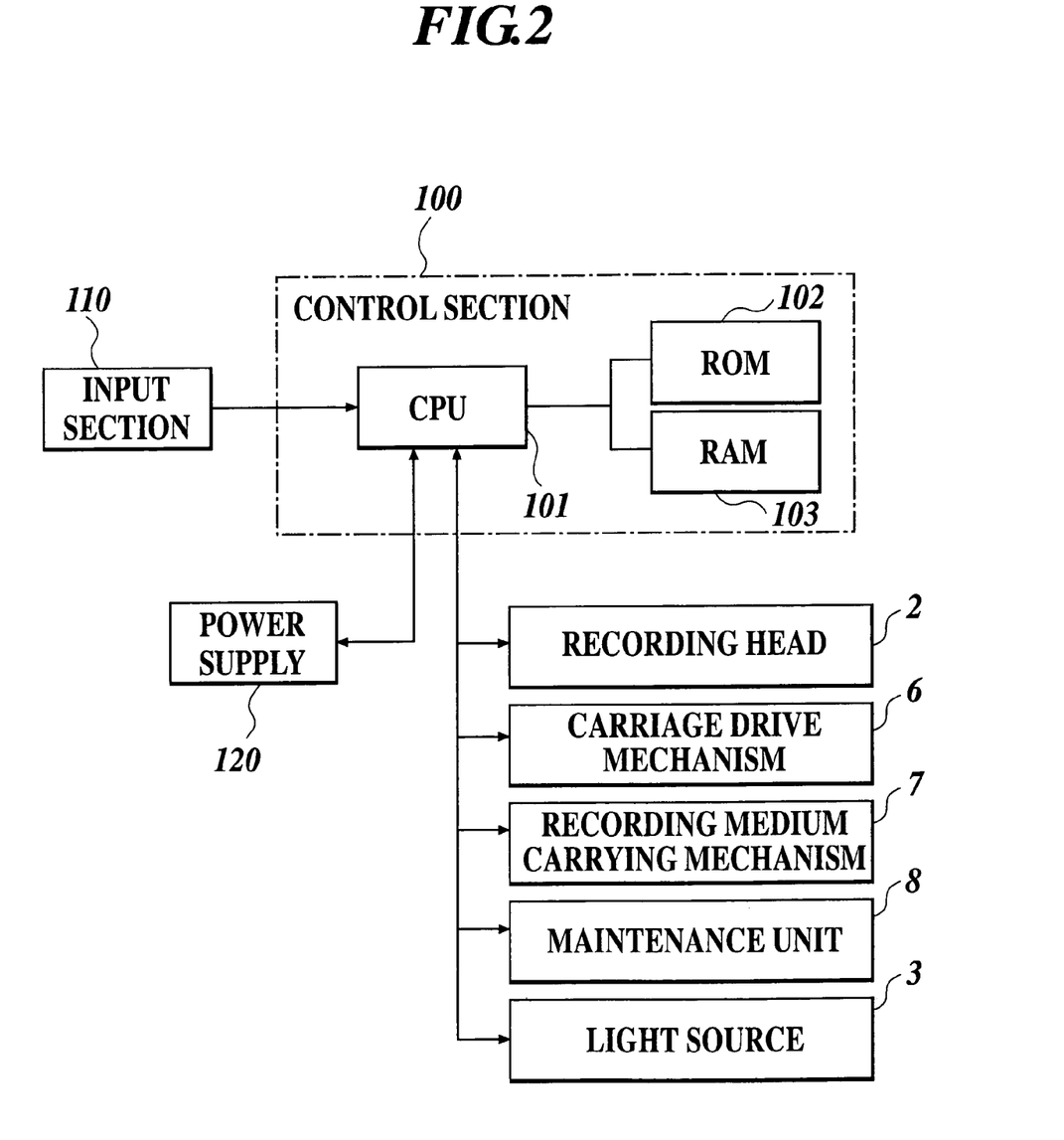
FIG. 2 is a block diagram of the ink jet recording apparatus of the first embodiment.

As shown in FIG. 2, the control section 100 comprises a CPU 101 for executing various processes, a ROM 102 for storing various programs for various processes such as control, judgment or the like, and various data, and a RAM 103 comprising a storage area for temporarily storing work areas for various processes and data acquired by various processes.

In image recording, the control section 100 controls the recording heads 2, 2 . . . to jet ink according to the various programs stored in the ROM 102, the light sources 3, 3 . . . to turn on or off, the carriage drive mechanism 6 to drive the carriage 4, and the recording medium carrying mechanism 7 to carry the recording medium 16.

The control section 100 controls the maintenance unit 8 to perform a maintenance operation according to the various programs stored in the ROM 102 in the maintenance operation, and also controls the light sources 3, 3 . . . to turn off in wipe maintenance.

Further, an input section 110 such as a keyboard, a control panel or the like for accepting input of operation, date or information, a power source 120, the recording heads 2, 2 . . . , the light sources 3, 3 . . . , the carriage drive mechanism 6, the recording medium carrying mechanism 7, the maintenance unit 8 or the like are connected to the control section 100 through each interface (not shown).

The ink applicable in this embodiment is the ink adapted in "Curing System Utilizing Photo-Acid and Base Generating Agent (Section 1)" or "Photo-induced Alternating Copolymerization (Section 2)" of "Photo-Curing System (Chapter 4)" in "Photo-Curing Technique-Selection and Compounding Condition of Resin and Initiator, and Measurement and Assessment of Curing Degree (Technical Association Information)". The ink may be a type of being cured by a normal radical polymerization.

Specifically, the ink used in this embodiment is ultraviolet curable ink having a property to cure by irradiation with ultraviolet rays as light, which includes at least polymerizable compound (including publicly known polymerizable compound), photo initiator, and color material as a main component. In a case of using the ink adapted to the above described "Photo-induced Alternating Copolymerization (Section 2)", initiator may be excluded.

The above ultraviolet curable ink is classified into radical curable ink having radical polymerizable compound and cationic curable ink having cationic polymerizable compound, and both of them are applicable as the ink used in this embodiment. Further, hybrid ink in which radical curable ink and cationic curable ink are combined may also be applied as the ink used in this embodiment.

However, cationic curable ink in which polymerization reaction is not or less inhibited by oxygen is excellent at functionality and versatility, therefore cationic curable ink is especially used in this embodiment. Specifically, the cationic curable ink used in this embodiment is mixture comprising at least cationic polymerizable compound such as oxetane compound, epoxide compound, vinyl ether compound or the like, photo cationic initiator, color material, and has a property to be cured by irradiation with ultraviolet rays as described above.

As the recording medium used in this embodiment, a transparent or nontransparent resin film having no absorptivity which is used for so called soft packing can be applied. Specific examples of resin for the resin film includes polyethylene terephthalate, polyester, polyolefin, polyamide, polyester amide, polyether, polyimide, polyamideimide, polystyrene, polycarbonate, poly-p-phenylene sulfide, polyetherester, polyvinyl chloride, poly (meth) acrylic ester, polyethylene, polypropylene, nylon or the like. Further, copolymer, mixture, or cross linking of these resins can also be applied. Especially, selecting any one of oriented polyethylene terephthalate, polystyrene, polypropylene and nylon is preferable as resin for the resin film in view of transparency, dimensional stability, stiffness, environmental burden, cost or the like, and it is preferable that the resin film with a thickness of 2 to 100 μm (more preferably, 6 to 50 μm) is used. The surface of a supporter of the resin film may be pre-treated to enhance adhesion by corona discharge or the like. Further, as the recording medium used in this embodiment, a nontransparent publicly known recording medium such as various papers coated with resin on the surface thereof, a film having pigment, an foamed film or the like can also be applied.

Next, operations of this embodiment will be explained.

When the control section 100 receives image recording information by the input section 110, the control section 100 controls the recording heads 2, 2 . . . , the light sources 3, 3 . . . , the carriage drive mechanism 6 and the recording medium carrying mechanism 7 to make each of them perform an operation according to the image recording information to start image recording.

The control section 100 controls the maintenance unit 8 to start the maintenance operation.

The maintenance operation will be explained.

First, in the maintenance operation, the control section 100 controls the carriage drive mechanism 6 to move the carriage 4 on which the recording heads 2, 2 . . . and the light sources 3, 3 . . . are mounted to the maintenance region B.

When the recording heads 2, 2 . . . reaches a predetermined position in the maintenance region B, the maintenance unit 8 is moved to the recording heads 2, 2 . . . side by the above described maintenance unit drive mechanism, thereby the nozzle-plates of the recording heads 2, 2 . . . are covered with the suction caps 10, 10 . . . to seal the jet openings.

The control section 100 controls the maintenance unit 8 to activate the suction pumps 12, 12 . . . to suction ink from the nozzle-plates. The ink suctioned is stored in the waste ink tank 13 through the ink communicating tubes 11, 11 . . . .

According to this embodiment, the light sources are kept turned on in the suction maintenance performed by the suction caps 10, 10 . . . , however, the nozzle-plates of the recording heads 2, 2 . . . are thoroughly covered with the suction caps 10, 10 . . . in this suction maintenance, thereby avoiding light from the light sources to enter into the nozzle-plates.

After completion of the suction maintenance, the control section 100 turns the light sources 3, 3 . . . off.

The control section 100 moves the maintenance unit 8 by the above maintenance unit drive mechanism, thereby separating the suction caps 10, 10 . . . from the nozzle-plates of the recording heads 2, 2 . . . .

The control section 100 controls the maintenance unit 8 to reciprocate the maintenance unit 8 in the sub scanning direction Y by the maintenance unit drive mechanism, to thereby perform wipe maintenance of the recording heads 2, 2 . . . from the platen side in the main scanning direction X while pressing the nozzle-plates of the recording heads 2, 2 . . . onto the blade 15 of the wipe member 14.

Thereafter, the control section 10 controls the recording heads 2, 2 . . . which were subjected to wipe maintenance to purge ink residue.

After completion of the maintenance operation, the control section 100 controls the carriage drive mechanism 6 to move the carriage 4 on which the recording heads 2, 2 . . . and the light sources 3, 3 . . . are mounted to the recording region A.

In the moving operation of the carriage 4, the control section 100 controls the light sources 3, 3 . . . to turn on at the time that the rightmost light source 3 in the main scanning direction X passes over the platen 17.

In this embodiment, according to the ink jet recording apparatus 1 comprising the recording heads 2, 2 . . . of serial type which reciprocates in the main scanning direction X to perform image recording, since the light sources 3, 3 . . . are turned off when performing wipe maintenance, it can be prevented that the light diffusely reflected from the surfaces of the maintenance unit 8 on the recording heads 2, 2 . . . side enters into a portion near the jet openings at the time of the maintenance operation, enabling to obtain an ink jet recording apparatus with high reliability, which can avoid clogging of photo curable ink, ink jet path bending, or the like.

Although the above described ink has viscosity of 10 to 50 mPa/s at 25° C. and surface tension of 20 to 40 mN/m, that is having high viscosity and low wetting property, the ink can be prevented from adhering and fixing by the suction cap 9, thereby enabling to perform the suction operation even in the case of using the ink such as ultraviolet curable ink.

Figure 3:
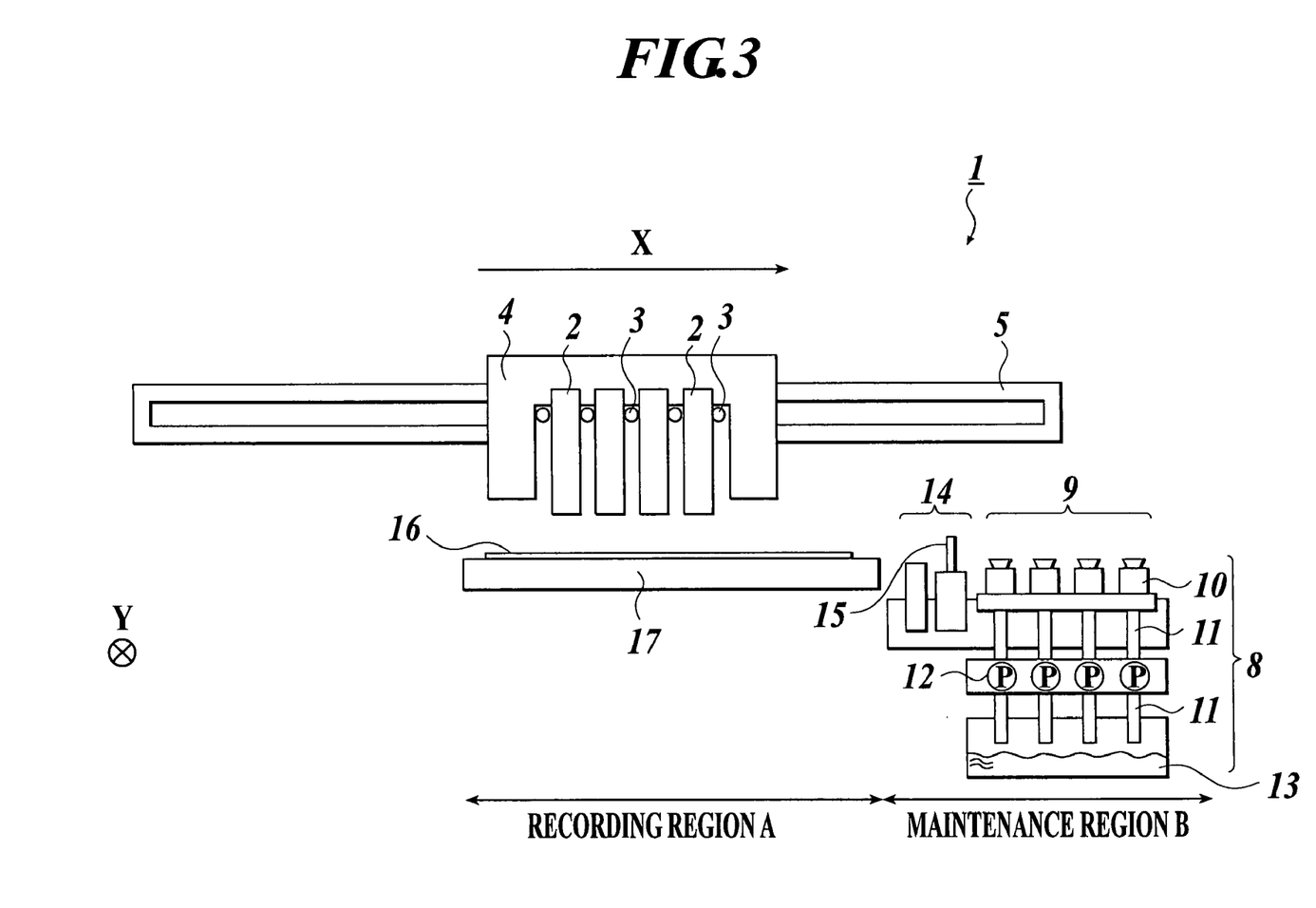
FIG. 3 is a schematic view showing a main portion of another ink jet recording apparatus of the first embodiment.

As shown in FIG. 3, the light source 3 may be arranged on both sides of each recording head 2 in the main scanning direction X. In this case, the same effect of the present invention can be obtained.

In the ink jet recording apparatus 1 in this embodiment, the light sources 3, 3 . . . are turned off only at the time of wipe maintenance, however, they may be turned off at the time of suction maintenance. As described above, since the nozzle-plates of the recording heads 2, 2 . . . are thoroughly covered with the suction caps 10, 10 . . . at the time of suction maintenance, light from the light sources 3, 3 . . . is prevented from entering into the nozzle-plates of the recording heads 2, 2 . . . . However, when ink which may exist at a contact portion where the nozzle-plates contact the suction caps is cured, the nozzle-plates would adhere to the suction caps 10, 10 . . . . But, in the case where the light sources 3, 3 . . . are turned off at the time of suction maintenance, ink curing at the contact portion can be prevented. As is described above, when the light sources 3, 3 . . . are turned off at the time of wipe maintenance or suction maintenance, ink adhered to the wipe member 14 or the suction caps 10, 10 . . . can be prevented from curing, enabling to normally perform maintenance over a long period of time.

Moreover, in this embodiment, the light sources 3, 3 . . . are turned off at the time of wipe maintenance, however, in the case where the light quantity of the light sources 3, 3 . . . is ½ or less of that at the time of image recording, light from the light sources which was diffusely reflected from the maintenance unit entering into the recording head side can be reduced. When image recording is performed after the completion of maintenance, the light sources 3, 3 . . . need to be turned on with a light quantity necessary for image recording. However, in the case that the light sources 3, 3 . . . are turned off while performing maintenance, it would take some time to obtain the light quantity needed. But, when the light sources 3, 3 . . . have a light quantity which is ½ or less of that at the time of image recording in maintenance, the time needed to restart image recording can be shortened.

An ink jet recording apparatus 40 according to the second embodiment will be explained referring to FIG. 4. The above described ink jet recording apparatus 1 according to the first embodiment is configured such that wipe maintenance is performed by pressing the blade 15 onto the nozzle-plates of the recording heads 2, 2 . . . , however, in the second embodiment, the ink jet recording apparatus 40 is configured to perform wipe maintenance by wiping ink on the nozzle-plates with a sheet-shaped wipe member made of fibers. In the following explanations, the same constitutional elements as those of the ink jet recording apparatus 1 in the first embodiment are indicated by the reference numerals, and the explanations thereof are omitted.

Figure 4:
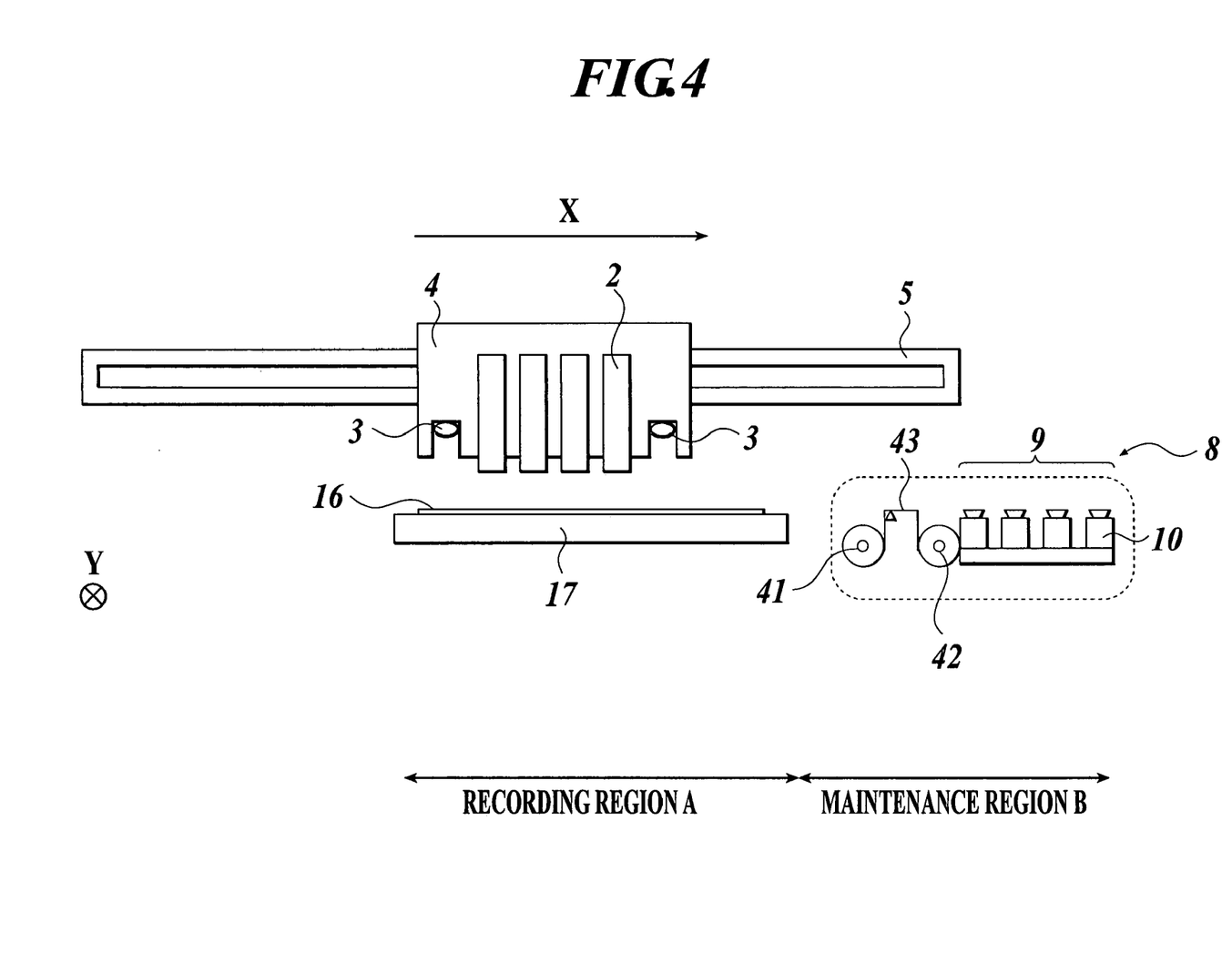
FIG. 4 is a schematic view showing a main portion of an ink jet recording apparatus of the second embodiment.

As shown in FIG. 4, in one end side of the suction cap 9, there is provided a rotatable first roll shaft 41 and a rotatable second roll shaft 42 which is parallel to the first roll shaft 41. A sheet shaped wipe member 43 is wound in a roll shape on the first roll shaft 41, and the tip portion of the wipe member 43 is fixed on the second roll shaft 42. That is, when the second roll shaft 42 is driven to rotate, the wipe member 43 is fed from the first roll shaft 43 to be wound around the second roll shaft 42.

The wipe member 43 is formed with extra fine fibers having fineness of 0.2 to 0.01 denier to raise the efficiency of ink absorptivity. Polyester, acrylic, nylon or the like are preferably used as the fiber.

Wipe maintenance by the wipe member 43 will be explained.

After the completion of suction maintenance by the suction cap 9, a control section 100 reciprocates the maintenance unit 8 in the sub scanning direction Y to perform wipe maintenance of the recording heads 2, 2 . . . from the platen side in the main scanning direction X while pressing the wipe member 43 onto the nozzle-plates of the recording heads 2, 2 . . . . After performing wipe maintenance certain times, the control section 100 rotates the second roll shaft 42 to wind a portion of the wipe member 43 to which ink is adhered to pull out a portion to which no ink is adhered.

As described above, according to the ink jet recording apparatus of the second embodiment, since the portion of the wipe member 43 to which ink is adhered is wound around the second roll shaft 42 in order, the wipe member 43 wound around the second roll shaft 42 can be collected, and furthermore, preparation to arrange a new wipe member 43 onto the first roll shaft 41 can be performed.

The third embodiment of the present invention will be explained referring to FIG. 5.

Figure 5:
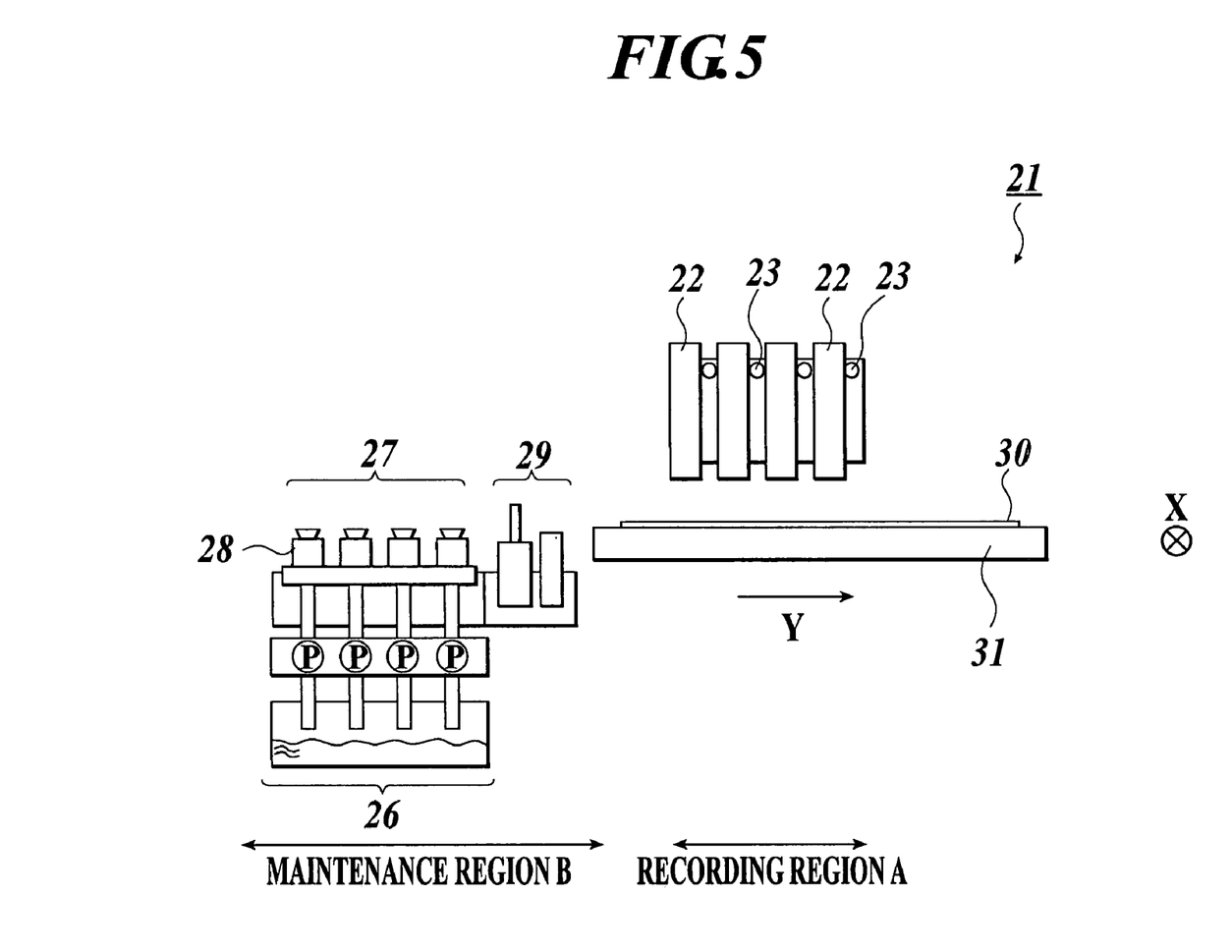
FIG. 5 is a schematic view showing a main portion of an ink jet recording apparatus of the third embodiment.

As shown in FIG. 5, an ink jet recording apparatus 21 in this embodiment is a line type, comprising a carrier (not shown) for supporting recording heads 22, 22 . . . having jet openings for jetting photo curable ink of any one of colors of yellow (Y), magenta (M), cyan (C), and black (Bk), and light sources 23, 23 . . . for irradiating ink jetted onto a recording medium 30 with light to cure the ink. The recording heads 22, 22 . . . are arranged to extend in a width direction of the recording medium 30 above the recording medium 30, and each light source 23 is arranged in the downstream side with respect to each recording head 22 in the carrying direction Y.

The carrying direction of the recording medium 30 is referred to as the sub scanning direction Y, and a recording medium carrying mechanism 25 is provided for carrying the recording medium 30 in the sub scanning direction Y.

A region in which recording is performed to the recording medium 30 is referred to as the recording region A, in which a platen 30 is provided to support the recording medium 30 from a non-recording surface thereof.

In a region which is in the backward of the recording region A in the carrying direction of the recording medium 30, there is provided a maintenance unit 26 for performing a maintenance operation of the jet openings or the like of the recording heads 22, 22 . . . . The region where the maintenance unit 26 is arranged is referred to as a maintenance region B.

In the maintenance region B, there is provided a carrier drive mechanism (not shown) for arranging the recording heads 22, 22 . . . and the light sources 23, 23 . . . supported by the carrier (not shown).

The maintenance unit 26 is provided with a suction cap member 27 which comprises suction caps 28, 28 . . . as many as the recording heads 22, 22 . . . . Each suction cap 28 is arranged so as to face one of the recording heads 22, 22 . . . to cover the nozzle-plates of the recording heads 22, 22 . . . when the carrier (not shown) is arranged in the maintenance region B. Also, the maintenance unit 26 comprises a maintenance unit drive mechanism (not shown) for moving the maintenance unit 26 to the recording heads 22, 22 . . . side, thereby closely contacting the jet openings of the recording heads 22, 22 . . . with the suction caps 28, 28 . . . .

The maintenance unit 26 is provided with a wipe member 29 near the suction caps 28, 28 . . . on the platen 31 side in the sub scanning direction Y. Wipe maintenance is performed by pressing the wipe member 29 onto the nozzle-plates of the recording heads 22, 22 . . . , so that the maintenance unit 26 reciprocates in the main scanning direction X by the maintenance unit drive mechanism.

Configuration of the control section in the third embodiment is substantially the same as that in the first embodiment, and therefore, the explanation thereof is omitted here.

The maintenance operation in the third embodiment will be explained.

In the maintenance operation, the control section controls the carrier drive mechanism to move the recording heads 22, 22 . . . and the light sources 23, 23 . . . supported by the carrier (not shown) to the maintenance region B.

When the recording heads 22, 22 . . . reaches a predetermined position in the maintenance region B, the maintenance unit 26 is moved to the recording heads 22, 22 . . . side by the above described maintenance unit 26, and thereby the nozzle-plates of the recording heads 22, 22 . . . are covered with the suction caps 28, 28 . . . to seal the jet openings.

According to this embodiment, the light sources are kept turned on in suction maintenance performed by the suction caps 28, 28 . . . , however, the nozzle-plates of the recording heads 22, 22 . . . are thoroughly covered with the suction caps 28, 28 . . . in this suction maintenance, thereby avoiding light from the light sources to enter into the nozzle-plates of the recording heads 22, 22 . . . .

After the completion of suction maintenance, the control section controls the light sources 23, 23 . . . to turn off.

The control section moves the maintenance unit 26 by the maintenance unit drive mechanism to separate the suction caps 28, 28 . . . from the nozzle-plates of the recording heads 22, 22 . . . .

Then, the control section controls the maintenance unit 26 to reciprocate in the main scanning direction X by the maintenance unit drive mechanism, to thereby perform wipe maintenance of the recording heads 22, 22 . . . from the recording region side in the sub scanning direction Y while pressing the wipe member 29 onto the nozzle-plates of the recording heads 22, 22 . . . . Thereafter, the control section controls the recording heads 22, 22 . . . which were subjected to wipe maintenance to purge ink residue.

After the completion of maintenance operation, the control section controls the carrier drive mechanism to move the recording heads 22, 22 . . . and the light sources 23, 23 . . . supported by the carrier (not shown) to the recording region A.

When the recording heads 22, 22 . . . and the light sources 23, 23 . . . are arranged in the recording region A, the control section controls the light sources 23, 23 . . . to turn on.

According to this embodiment, in the ink jet recording apparatus 21 in which the recording heads 22, 22 . . . are arranged to extend in the width direction of the recording medium 30, and recording is performed while moving the recording medium 30, since the light sources 23, 23 . . . are turned off when performing wipe maintenance, it can be prevented that the light diffusely reflected from the surface of the maintenance unit 26 onto the recording heads 22, 22 . . . side from entering into a portion near the jet openings at a time of the maintenance operation, enabling to obtain an ink jet recording apparatus with high reliability, which can avoid clogging of photo curable ink, ink jet path bending or the like.

The entire disclosure of Japanese Patent Application No. Tokugan 2003-137714 which were filed on May 15, 2003 and Japanese Patent Application No. Tokugan 2004-92499 which were filed on Mar. 26, 2004, including specification, claims, drawings and summary are incorporated herein by reference in its entirety.

What is claimed is:

1. An ink jet recording apparatus—comprising:
   a recording head having a jet opening for jetting an ink which is cured by an irradiation with light, toward a recording medium;
   a light source for irradiating an ink jetted on the recording medium with light;
   a maintenance unit for performing a maintenance operation to the recording head;
   a suction cap member to suction an ink from the jet opening or near the jet opening;
   a wipe member to wipe an ink in the jet opening or near the jet opening;
   a control section for controlling the light source to turn on or off, wherein the control section controls the light source to have a light quantity of ½ or less of that at a time of an image recording, in a maintenance operation performed by at least one of the wipe member and the suction cap member.

2. The apparatus of claim 1, wherein the control section controls the light source to turn off at a time of a maintenance operation performed by at least one of the wipe member and the suction cap member.

3. The apparatus of claim 1, wherein the recording head is a serial type in which a recording is performed by reciprocating the recording head in a main scanning direction.

4. The apparatus of claim 1, wherein the ink comprises an ultraviolet curable ink.

5. An ink jet recording apparatus comprising:
a recording head having a jet opening for jetting an ink which is cured by an irradiation with light, toward a recording medium;
a light source for irradiating an ink jetted on the recording medium with light;
a maintenance unit for performing a maintenance operation to the recording head;
a suction cap member to suction an ink from the jet opening or near the jet opening;
a wipe member to wipe an ink in the jet opening or near the jet opening;
a control section for controlling the light source to turn on or off, wherein:
the control section controls the light source to have a light quantity of ½ or less of that at a time of an image recording, in a maintenance operation performed by at least one of the wipe member and the suction cap member; and
the recording head is a line head type in which the recording head is arranged to extend in a width direction of the recording medium to perform a recording while moving the recording medium.

6. The apparatus of claim 5, wherein the control section controls the light source to turn off at a time of a maintenance operation performed by at least one of the wipe member and the suction cap member.

7. The apparatus of claim 5, wherein the recording head is a serial type in which a recording is performed by reciprocating the recording head in a main scanning direction.

8. The apparatus of claim 5, wherein the ink comprises an ultraviolet curable ink.

9. The apparatus of claim 8, wherein the ultraviolet curable ink has a viscosity of 10 to 50 mPa·s at 25° C. and a surface tension of 20 to 40 mN/m.

10. The apparatus of claim 9, wherein the ink comprises a cationic polymerizable ink.

11. An ink jet recording apparatus comprising:
a recording head having a jet opening for jetting an ink which is cured by an irradiation with light, toward a recording medium;
a light source for irradiating an ink jetted on the recording medium with light;
a maintenance unit for performing a maintenance operation to the recording head;
a suction cap member to suction an ink from the jet opening or near the jet opening;
a wipe member to wipe an ink in the jet opening or near the jet opening;
a control section for controlling the light source to turn on or off, wherein:
the control section controls the light source to have a light quantity of ½ or less of that at a time of an image recording, in a maintenance operation performed by at least one of the wipe member and the suction cap member; and
the ink comprises an ultraviolet curable ink that has a viscosity of 10 to 50 mPa·s at 25° C. and a surface tension of 20 to 40 mN/m.

12. The apparatus of claim 11, wherein the ink comprises a cationic polymerizable ink.

13. The apparatus of claim 11, wherein the control section controls the light source to turn of f at a time of a maintenance operation performed by at least one of the wipe member and the suction cap member.

14. The apparatus of claim 11, wherein the recording head is a serial type in which a recording is performed by reciprocating the recording head in a main scanning direction.

15. The apparatus of claim 11, wherein the ink comprises a cationic polymerizable ink.

16. An ink jet recording apparatus comprising:
a recording head having a jet opening for jetting an ink which is cured by an irradiation with light, toward a recording medium;
a light source for irradiating an ink jetted on the recording medium with light;
a maintenance unit for performing a maintenance operation to the recording head;
a suction cap member to suction an ink from the jet opening or near the jet opening;
a wipe member to wipe an ink in the jet opening or near the jet opening;
a control section for controlling the light source to turn on or off, wherein:
the control section controls the light source to have a light quantity of ½ or less of that at a time of an image recording, in a maintenance operation performed by at least one of the wipe member and the suction cap member; and
each of the wipe member is formed with an extra fine fiber having a fineness of 0.2 to 0.01 denier and is formed in a sheet shape wound around a first roll shaft and a second roll shaft, and an absorbing member fed from the first roll shaft is wound around the second roll shaft.

* * * * *